United States Patent
Lu et al.

(10) Patent No.: US 10,599,220 B2
(45) Date of Patent: Mar. 24, 2020

(54) DISPLAY DEVICE

(71) Applicant: Shanghai Tianma Micro-Electronics Co., Ltd., Shanghai (CN)

(72) Inventors: Feng Lu, Shanghai (CN); Hiroshi Haga, Shanghai (CN)

(73) Assignee: SHANGHAI TIANMA MICRO-ELECTRONICS CO., LTD., Shanghai (CN)

( * ) Notice: Subject to any disclaimer, the term of this patent is extended or adjusted under 35 U.S.C. 154(b) by 0 days.

(21) Appl. No.: 15/920,709

(22) Filed: Mar. 14, 2018

(65) Prior Publication Data

US 2019/0025922 A1 Jan. 24, 2019

(30) Foreign Application Priority Data

Jul. 20, 2017 (CN) .......................... 2017 1 0597668

(51) Int. Cl.
*G06F 3/01* (2006.01)
*G06F 3/041* (2006.01)
*G06F 1/16* (2006.01)

(52) U.S. Cl.
CPC ............ *G06F 3/016* (2013.01); *G06F 1/1626* (2013.01); *G06F 1/1637* (2013.01); *G06F 1/1643* (2013.01); *G06F 3/0414* (2013.01); *G06F 3/0416* (2013.01); *G06F 2203/04103* (2013.01); *G06F 2203/04105* (2013.01)

(58) Field of Classification Search
None
See application file for complete search history.

(56) References Cited

U.S. PATENT DOCUMENTS

| 2012/0242593 A1* | 9/2012 | Kim | G06F 3/016 345/173 |
| 2013/0285506 A1* | 10/2013 | Takeda | H02N 2/001 310/317 |
| 2015/0209668 A1* | 7/2015 | Obana | A63F 13/285 463/31 |

FOREIGN PATENT DOCUMENTS

| JP | 2013228886 A | 11/2013 |
| WO | 2012108204 A1 | 8/2012 |

OTHER PUBLICATIONS

Japanese Office Action dated May 27, 2019 for corresponding JP Patent Application No. 2018-043825.

* cited by examiner

*Primary Examiner* — Kenneth B Lee, Jr.
(74) *Attorney, Agent, or Firm* — Tarolli, Sundheim, Covell & Tummino LLP

(57) ABSTRACT

The present disclosure provides a display device. The display device includes: a display panel, the display panel being divided into a display area and a peripheral area surrounding the display area, wherein a plurality of force sensors is disposed in the peripheral area; and at least one vibration device, configured to drive the display panel to vibrate, so as to release stress accumulated in the display panel. The technical solution of the present disclosure can improve the detection accuracy of the force sensor with respect to a force.

16 Claims, 7 Drawing Sheets

DISPLAY DEVICE

CROSS-REFERENCE TO RELATED APPLICATIONS

The present application claims priority to Chinese Patent Application No. 201710597668.2, filed on Jul. 20, 2017, the content of which is incorporated herein by reference in its entirety.

TECHNICAL FIELD

The present disclosure relates to the field of display technologies and, in particular, to a display device.

BACKGROUND

A display panel having a touch function is widely used in display devices such as cellphones, tablet computers, public information inquiry machines and the like. A user can operate the display device with a finger by only touching a logo on the display panel, which eliminates the user's dependence on other input devices (such as keyboards and mice), thereby making human-computer interaction easier.

In order to meet the user's requirements better, a force sensor is usually provided in the display panel for detecting the force subjected by the display panel from the user, so as to enable the display panel not only to collect touch position information, but also to collect force magnitude information, thereby enlarging the application range of touch technologies.

The structure of the display panel is complex and includes a plurality of film layers. When an external force is applied, the layers may be elastically deformed or non-elastically deformed, in which the non-elastic deformation remains in the layers and the layers cannot be restored from the non-elastic deformation, so that stress is accumulated in the display panel. Therefore, the force sensor still has a certain deformation even though the position where the force sensor is located is not subjected to force, thereby leading to baseline drifting of the force sensor, which may influence the detection accuracy of the force sensor with respect to the force.

SUMMARY

The present disclosure provides a display device, which can improve the detection accuracy of the force sensor with respect to a force.

The present disclosure provides a display device. The display device includes a display panel, the display panel is divided into a display area and a peripheral area surrounding the display area. A plurality of force sensors is disposed in the peripheral area. The display device further includes at least one vibration device, which is configured to drive the display panel to vibrate to release stress accumulated in the display panel.

The present disclosure further provides a display device, the display device includes a display panel, a touch screen coupled to the display panel, and a force sensor for detecting pressing of the touch screen. The display device further includes at least one vibration device, and the display device vibrates the display panel to eliminate stress accumulated on the display panel and present a haptic feedback to a user.

The present disclosure provides a display device. The display device includes a display panel, which is divided into a display area and a peripheral area surrounding the display area. A plurality of force sensors is provided in the peripheral area. The display device further includes at least one vibration device, which is used to drive the display panel to vibrate, so as to release stress accumulated in display panel, so that each layer included in the display panel can be restored from non-elastic deformation, and thus the force sensor is not deformed when no force is applied to a position where the force sensor is located, which can effectively prevent a baseline of the force sensor from drifting, thereby improving the detection accuracy of the force sensor with respect to the force.

BRIEF DESCRIPTION OF DRAWINGS

In order to more clearly illustrate technical solutions in embodiments of the present disclosure or in the related art, the accompanying drawings used in the embodiments and in the related art are briefly introduced as follows. It is appreciated that, the drawings described as follows are merely part of the embodiments of the present disclosure, other drawings can also be acquired by those skilled in the art without paying creative efforts.

DESCRIPTION OF EMBODIMENTS

The accompanying drawings are briefly introduced as follows. The drawings are not meant to be limiting; those skilled in the art will be able to see alternative drawings without paying creative effort.

It should be noted that various features in the embodiments of the present disclosure may be combined with each other. The present disclosure will be described in detail as follows with reference to the accompanying drawings and embodiments.

Figure 1:
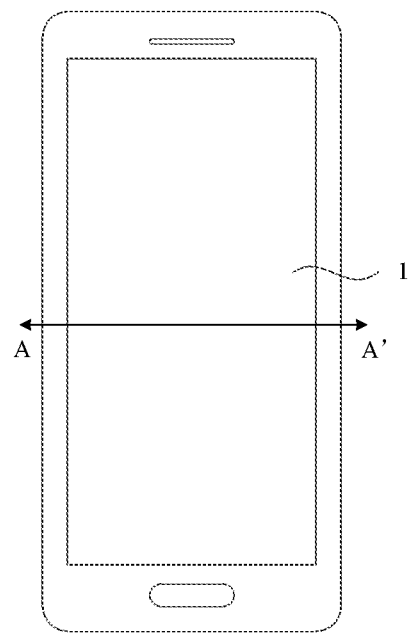
FIG. 1 is schematic diagram I of a display device provided by an embodiment of the present disclosure.
Figure 2:
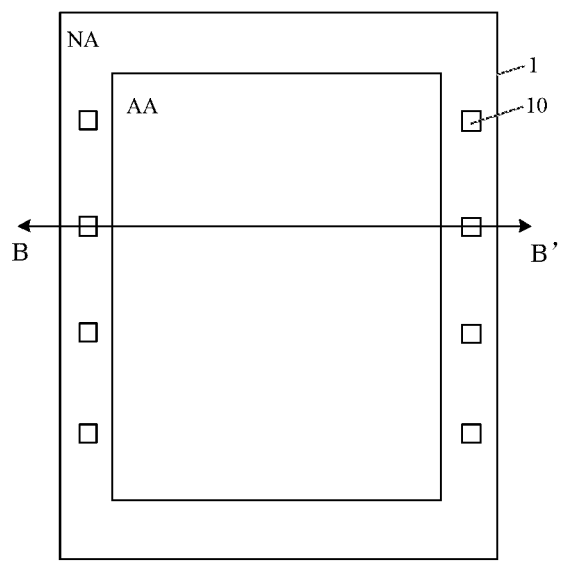
FIG. 2 is a schematic diagram of a display panel provided by an embodiment of the present disclosure.
Figure 3:
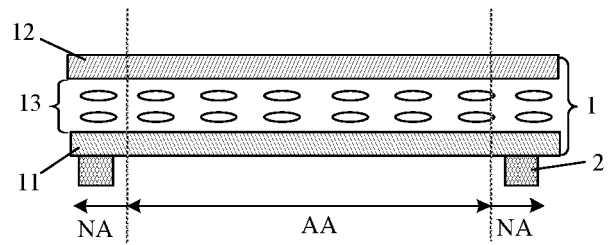
FIG. 3 is cross-sectional view I along direction A-A' in FIG. 1 provided by an embodiment of the present disclosure.
Figure 4:
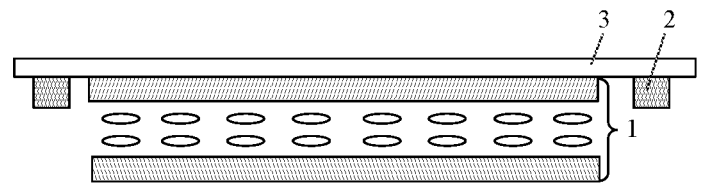
FIG. 4 is cross-sectional view II along direction A-A' in FIG. 1 provided by an embodiment of the present disclosure.
Figure 5:
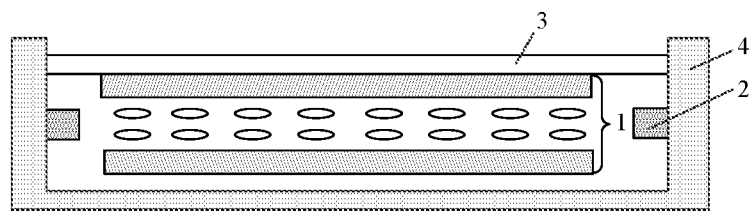
FIG. 5 is cross-sectional view III along direction A-A' in FIG. 1 provided by an embodiment of the present disclosure.

The present disclosure provides a display device. As shown in FIGS. 1-5, FIG. 1 is schematic diagram I of a display device provided by an embodiment of the present disclosure; FIG. 2 is a schematic diagram of a display panel provided by an embodiment of the present disclosure; FIG. 3 is cross-sectional view I along direction A-A' in FIG. 1 provided by an embodiment of the present disclosure; FIG. 4 is cross-sectional view II along direction A-A' in FIG. 1 provided by an embodiment of the present disclosure; and FIG. 5 is cross-sectional view III along direction A-A' in FIG. 1 provided by an embodiment of the present disclosure. The display device includes a display panel 1, which is divided into a display area AA and a peripheral area NA surrounding the display area AA. A plurality of force sensors 10 is provided in the peripheral area NA. The display device further includes at least one vibration device 2, which is used to drive the display panel 1 to vibrate, so as to release stress accumulated in display panel 1. The display device provided in the present disclosure may be any device having a display function, such as a smart cellphone, a wearable smart watch, smart glasses, a tablet computer, a television, a displayer, a laptop computer, a digital photo frame, a navigator, a car monitor, an e-book, etc.

The principle of detecting the magnitude of a force by the force sensor 10 is as follows: when a force is applied to a certain position on the display panel 1, the position where the force sensor 10 is located is subjected to a stress caused by the force. Under the action of this stress, the force sensor 10 is deformed and the resistance of the force sensor 10 changes, then an output value of the force sensor 10 changes, and thus the magnitude of the force subjected by the display panel 1 can be calculated via this change. When the force sensor 10 is not subjected to a force, the output value of the force sensor 10 is in conformity to a baseline of the force sensor 10. Therefore, the change of the output value of the force sensor 10 is a difference between the baseline and the output value when the force sensor 10 is subjected to a stress. Thus, if the baseline of the force sensor 10 drifts, the calculated magnitude of the force may not be accurate when the force sensor 10 is subjected to a stress, i.e., when the display panel is subjected to a force, the magnitude of the force calculated is not accurate, thus the accuracy of the force sensor 10 with respect to force is poor. A main reason for baseline drifting of the force sensor 10 lies in that, the display panel 1 is complex in structure and includes a plurality of film layers, and the layers may be elastically and non-elastically deformed when being pressed, the non-elastic deformation remains in the layers and thus the layers cannot be restored from the non-elastic deformation, so that stress is accumulated in the display panel 1. As a result, the force sensor 10 still has a certain deformation even without being subjected to a stress.

In embodiments of the present disclosure, the stress accumulated in the display panel 1 can be released by vibration of the vibration device 2 included in the display device at a proper timing after a force is applied to the display panel 1, so that each layer included in the display panel 1 is restored from non-elastic deformation, at this time, a position where the force sensor 10 is located is restored from the non-elastic deformation, so that the force sensor 10 is not deformed when no force is applied to the force sensor 10, which can effectively prevent the baseline of the force sensor 10 from drifting, thereby improving the detection accuracy of the force sensor 10 with respect to the force.

In order to allow those skilled in the art to better understand the effect of the present solution, the following embodiments of the present disclosure are described with reference to the accompanying drawings. A comparison is made with respect to output values of the force sensor when the display panel is pressed twice using a same magnitude of force in the related art, and output values of the force sensor when the display panel is pressed twice using a same magnitude of force in the embodiments of the present disclosure.

Figure 6:
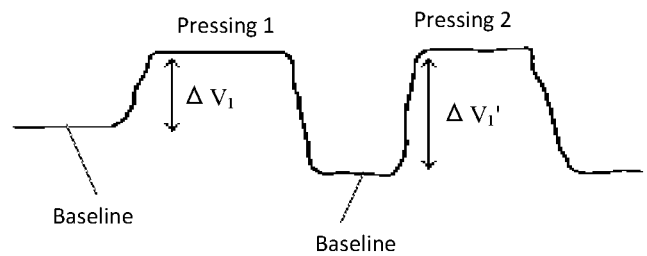
FIG. 6 is a schematic diagram of output signals of a force sensor when a display panel is pressed twice using a same magnitude of force according to the related art.

As shown in FIG. 6, FIG. 6 is a schematic diagram of output signals of the force sensor when the display panel is pressed twice using a same magnitude of force according to the related art. In the related art, when the display panel is pressed twice by using the same magnitude of force (for example, 4900N), a difference between an output value of the force sensor and the baseline during the first pressing (indicated as pressing 1 in FIG. 6) is $\Delta V_1$, the baseline of the force sensor drifts after the first pressing due to the accumulated stress in the various layers included in the display panel, and the result is that, a difference between an output value of the force sensor and the baseline during the second pressing (indicated as pressing 2 in FIG. 6) is $\Delta V_1'$, which has a large difference from $\Delta V_1$, resulting in a low detection accuracy of the force sensor with respect to the force.

Figure 7:
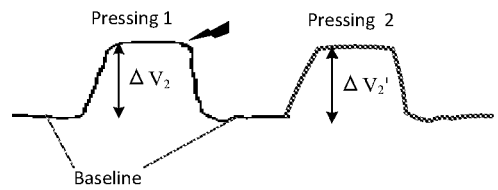
FIG. 7 is schematic diagram I of output signals of a force sensor when a display panel is pressed twice using a same magnitude of force according to an embodiment of the present disclosure.
Figure 8:
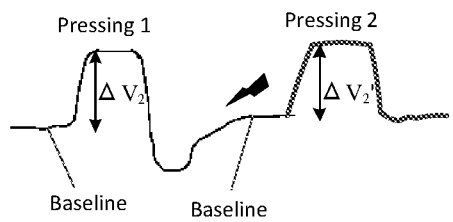
FIG. 8 is schematic diagram II of output signals of a force sensor when a display panel is pressed twice using a same magnitude of force according to an embodiment of the present disclosure.

As shown in FIG. 7 and FIG. 8, FIG. 7 is schematic diagram I of output signals of the force sensor when the display panel is pressed twice using a same magnitude of force according to an embodiment of the present disclosure; FIG. 8 is schematic diagram II of output signals of the force sensor when the display panel is pressed twice using a same magnitude of force according to an embodiment of the present disclosure. In embodiments of the present disclosure, when the display panel is pressed twice by using the same magnitude of force (for example, 4900N), a difference between an output value of the force sensor and the baseline during a first pressing (indicated as pressing 1 in FIG. 7 and FIG. 8) is $\Delta V2$. Between the first pressing and a second pressing (indicated as pressing 2 in FIG. 7 and FIG. 8), the vibration device 2 drives the display panel 1 to vibrate so as to release stress accumulated in the display panel 1, so that the baseline of the force sensor 10 can be restored. As a result, a difference between an output value of the force sensor and the baseline during the second pressing is $\Delta V2'$, which is the same as or close to $\Delta V2$ so that the detection accuracy of the force sensor 10 with respect to the force is high. A difference between FIG. 7 and FIG. 8 lies in that, the vibration device 2 vibrates the display panel 1 at different timings. FIG. 7 shows that the vibration device 2 vibrates the display panel 1 at the time when the first pressing is just ended (that is, the finger just left the display panel 1), FIG. 8 shows that the vibration device 2 vibrates the display panel 1 at the time when the first pressing has ended for a certain time and the second pressing has not yet started.

The inventor of the present disclosure found that, when the vibration frequency of the vibration device 2 is in a range of 1 Hz-1 kHz, the user can feel a vibration by his/her haptic feeling and can the user can be provided with a haptic feedback. In this case, the vibration generated by the vibration device 2 is used to achieve two functions of recovering the baseline and providing haptic feedback to the user, so as to improve the operability for the user. In particular, when the vibration frequency is nearby 200 Hz, the user can perceive a stronger stimulus than that under other vibration frequencies.

On the other hand, when the display device of the present disclosure is, for example, a smart cellphone, an operation with a so-called silent mode does not occur. The vibration frequency in the range of 1 Hz-1 kHz includes a human audible range. When the vibration frequency is set to be 40 Hz or lower, or 20 kHz or higher, it is possible to suppress the generation of sound and recover the baseline.

As described above, the vibration device 2 mounted on the display device of the present disclosure has two features of recovering the baseline and providing a haptic feedback when the user presses a button to improve the operability. That is, the display device of the present disclosure has the functions of recovering the baseline and providing a haptic feedback when the user presses the button.

It should be noted that, in embodiments of the present disclosure, the display device may include only one vibration device 2, two vibration devices 2, or more than two vibration devices 2, which will not be limited in embodiments of the present disclosure.

In addition, there may be a plurality of setting positions of the vibration device 2 in the display device, as long as the vibration device 2 can directly or indirectly vibrate the display panel 1, which will be described in the following embodiments of the present disclosure by way of example.

In a first example, as shown in FIG. 3, the vibration device 2 is provided in the peripheral area NA of the display panel 1. It should be noted that, usually the display panel 1 includes at least one display substrate, and the display substrate also includes a peripheral area corresponding to the peripheral area NA included in the display panel 1. Based on this, the vibration device 2 may be disposed in the peripheral area of the display substrate, specifically, either at a side facing toward the internal side of the display panel 1 or at a side facing toward the external side of the display panel 1. FIG. 3 only shows a case in which the vibration device 2 is disposed in the peripheral area of the display substrate, specifically, at the side facing toward the external side of the display panel 1.

In a second example, as shown in FIG. 4, the display device further includes a cover glass 3 covering a light-emitting side of the display panel 1 for protecting the display panel 1, an edge of the cover glass 3 exceeds the display panel 1. In this case, the vibration device 2 may be disposed at the edge of the cover glass 3 exceeding the display panel 1, and located at a side of the cover glass 3 facing toward the display panel 1.

In a third example, as shown in FIG. 5, the display device further includes a cover glass fixing structure 4 (for example, a housing of the display device) used for fixing the cover glass 3 at a certain position with respect to the display device. In this case, the vibration device 2 may be disposed on the cover glass fixing structure 4.

In the first example, the vibration generated by the vibration device 2 is directly transmitted to the display panel 1. In the second example, the vibration generated by the vibration device 2 is firstly transmitted to the cover glass 3, and then to the display panel 1. In the third example, the vibration generated by the vibration device 2 is firstly transmitted to the cover glass fixing structure 4, and then to the cover glass 3, and finally to the display panel 1. As described above, in the first example, as shown in FIG. 3, when the vibration device 2 is disposed in the peripheral area NA of the display panel 1, the vibration device 2 can better release stress accumulated in the display panel 1.

In the following, the quantity of the vibration device 2 included in the display device and the setting manners thereof will be described by taking an example that the vibration device 2 is disposed in the peripheral area NA of the display panel 1.

In an embodiment, the display device includes only one vibration device 2, which is disposed at an arbitrary position in the peripheral area NA of the display panel 1. In this case, the vibration device 2 vibrates at a proper timing after a force is applied to the display panel 1, thereby driving the display panel 1 to vibrate so as to release stress accumulated in the display panel 1, thereby allowing the baseline of each force sensor 10 to be restored. For example, a position having the most stress accumulated in the peripheral area NA can be detected by applying a same force to different positions on the display panel 1, specifically, this can be determined by an output value of each of the force sensors 10, and the vibration device 2 can be arranged at this position.

In an embodiment, the display device includes two vibration devices 2, and the two vibration devices 2 are evenly disposed in the peripheral area NA of the display panel 1. In this case, the two vibration devices 2 vibrate simultaneously at a proper timing after a force is applied to the display panel 1, thereby driving the display panel 1 to vibrate so as to release stress accumulated in the display panel 1, thereby allowing the baseline of each force sensor 10 to be restored. Alternatively, it is also possible that, one of the two vibration devices 2 closer to a position where a force is applied vibrates, thereby driving the display panel 1 to vibrate so as to release stress accumulated in the display panel 1, thereby allowing the baseline of each force sensor 10 to be restored. There is a plurality of manners in which the two vibration devices 2 are evenly disposed in the peripheral area NA of the display panel 1. In an embodiment, the peripheral area NA includes a left sub-area, a right sub-area, an upper sub-area and a lower sub-area, the two vibration devices 2 are respectively disposed at middle positions of the left and right sub-areas of the peripheral area NA of the display panel 1, or the two vibration devices 2 are respectively disposed at middle positions of the upper and lower sub-areas of the peripheral area NA of the display panel 1, or the two vibration devices 2 are respectively disposed at two diagonal positions of the display panel 1. In an embodiment, as shown in FIG. 1 and FIG. 3, when the display device is a smart cellphone, the two vibration devices 2 are respectively disposed at the middle positions of the left and right sub-areas of the peripheral area NA of the display panel 1.

Figure 9:
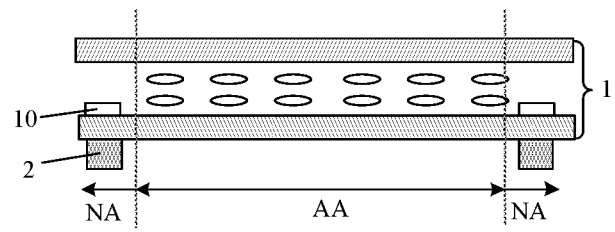
FIG. 9 is a cross-sectional view along direction B-B' in FIG. 2 provided by an embodiment of the present disclosure.

In an embodiment, the number of the vibration devices 2 included in the display device is equal to the number of the force sensors 10, and each vibration device 2 corresponds to a respective one force sensor 10. In this case, the vibration devices 2 vibrate simultaneously at a proper timing after a force is applied to the display panel 1, thereby driving the display panel 1 to vibrate so as to release stress accumulated in the display panel 1, thereby allowing the baseline of each force sensor 10 to be restored. Alternatively, it is also possible that, one or more of the vibration devices 2 vibrate (for example, one or more vibration devices 2 corresponding to the force sensors 10 with the maximal detected force vibrate), so as to drive the display panel 1 to vibrate and release stress accumulated in the display panel 1, thereby allowing the baseline of each force sensor 10 to be restored. As shown in FIG. 9, FIG. 9 is a cross-sectional view along direction B-B' in FIG. 2 provided by an embodiment of the present disclosure. Each vibration device 2 is disposed directly under the respective force sensor 10, i.e., at a side of the display substrate, where the force sensor 10 is located, facing toward the external side of the display panel 1. Alternatively, it is also possible that each vibration device 2 and the respective force sensor 10 are disposed at a side of the display substrate facing toward the internal side of the display panel 1, and there is a pre-set distance between each vibration device 2 and the respective force sensor 10. Accordingly, the pre-set distance is provided relatively smaller without affecting on wiring.

Similarly, when the vibration device 2 is disposed at an edge of the cover glass 3 exceeding the display panel 1 and is located at a side of the cover glass 3 facing toward the display panel 1, if the display device includes only one vibration device 2, the vibration device 2 may be disposed at arbitrary position on the edge of the cover glass 3. Obviously, a position having the most stress accumulated in the peripheral area NA can be detected by applying a same force to different positions on the display panel 1, specifically, this can be determined by an output value of each of the force sensors 10, and the vibration device 2 can be arranged at a position on the edge of the cover glass 3 which is closer to this detected position. In this case, the vibration device 2 vibrates at a proper timing after a force is applied to the display panel 1, thereby driving the cover glass 3 to vibrate, and thus driving the display panel 1 to vibrate so as to release stress accumulated in the display panel 1, thereby allowing the baseline of each force sensor 10 to be restored.

If the display device includes two vibration devices 2, the two vibration devices 2 are evenly disposed at an edge of the cover glass 3 exceeding the display panel 1, for example, the edge of the cover glass 3 includes a left sub-edge, a right sub-edge, an upper sub-edge, and a lower sub-edge. As shown in FIG. 4, the two vibration devices 2 are respectively disposed at middle positions of the left and right sub-edges of the edge of the cover glass 3, or the two vibration devices 2 are respectively disposed at middle positions of the upper and lower sub-edges of the edge of the cover glass 3, or the two vibration devices 2 are respectively disposed at two diagonal positions of the cover glass 3. In this case, the two vibration devices 2 vibrate simultaneously at a proper timing after a force is applied to the display panel 1, thereby driving the cover glass 3 to vibrate, and thus driving the display panel 1 to vibrate so as to release stress accumulated in the display panel 1, thereby allowing the baseline of each force sensor 10 to be restored. Alternatively, it is also possible that, one of the two vibration devices 2 closer to a position where a force is applied vibrates, thereby driving the cover glass 3 to vibrate, and thus driving the display panel 1 to vibrate so as to release stress accumulated in the display panel 1, thereby allowing the baseline of each force sensor 10 to be restored. In an embodiment, as shown in FIG. 1 and FIG. 4, when the display device is a smart cellphone, the two vibration devices 2 are respectively disposed at the middle positions of the left and right sub-edges of the edge of the cover glass 3.

When the vibration device 2 is disposed on the cover glass fixing structure 4, if the display device includes only one vibration device 2, the vibration device 2 may be disposed at any position on the cover glass fixing structure 4. Obviously, a position having the most stress accumulated in the peripheral area NA can be detected by applying a same force to different positions on the display panel 1, specifically, this can be determined by an output value of each of the force sensors 10, and the vibration device 2 can be arranged at a position on cover glass fixing structure 4 which is closer to this detected position. In this case, the vibration device 2 vibrates at a proper timing after a force is applied to the display panel 1, thereby driving the cover glass fixing structure 4 to vibrate, and thus driving the cover glass 3 to vibrate, thereby driving the display panel 1 to vibrate so as to release stress accumulated in the display panel 1, and thus allowing the baseline of each force sensor 10 to be restored.

If the display device includes two vibration devices 2, the two vibration devices 2 are evenly disposed on the cover glass fixing structure 4, for example, the cover glass fixing structure 4 includes a left side, a right side, an upper side, and a lower side, the two vibration devices 2 are respectively disposed at middle positions of the left and right sides of the cover glass fixing structure 4, or the two vibration devices 2 are respectively disposed at middle positions of the upper and lower sides of the cover glass fixing structure 4, or the two vibration devices 2 are respectively disposed at two diagonal positions of the cover glass fixing structure 4. In this case, the two vibration devices 2 vibrate simultaneously at a proper timing after a force is applied to the display panel 1, thereby driving the cover glass fixing structure 4 to vibrate, and thus driving the cover glass 3 to vibrate, thereby driving the display panel 1 to vibrate so as to release stress accumulated in the display panel 1, and thus allowing the baseline of each force sensor 10 to be restored. Alternatively, it is also possible that, one of the two vibration devices 2 closer to a position where a force is applied vibrates, thereby driving the cover glass fixing structure 4 to vibrate, and thus driving the cover glass 3 to vibrate, thereby driving the display panel 1 to vibrate so as to release stress accumulated in the display panel 1, and thus allowing the baseline of each force sensor 10 to be restored. In an embodiment, as shown in FIG. 1 and FIG. 5, when the display device is a smart cellphone, the two vibration devices 2 are respectively disposed at the middle positions of the left and right sides of the cover glass fixing structure 4.

Figure 10:
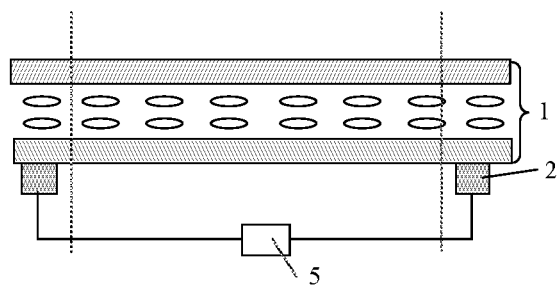
FIG. 10 is schematic diagram II of a display device provided by an embodiment of the present disclosure.
Figure 11:
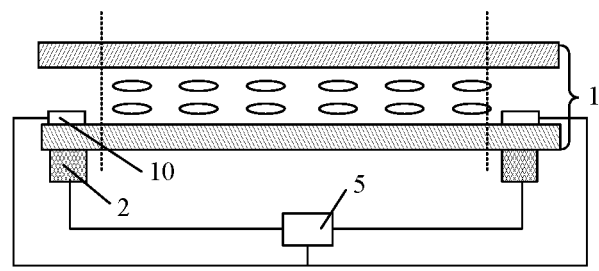
FIG. 11 is schematic diagram III of a display device provided by an embodiment of the present disclosure.
Figure 12:
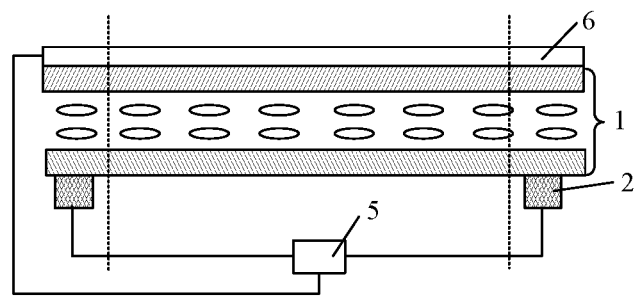
FIG. 12 is schematic diagram IV of a display device provided by an embodiment of the present disclosure.

As described above, the vibration device 2 included in the display device may have a plurality of vibration manners, and thus it shall be reasonably controlled. Optionally, as shown in FIGS. 10-12, FIGS. 10-12 are schematic diagram II-IV of a display device provided by embodiments of the present disclosure. In an embodiment, the display device further includes a vibration controlling device 5, which controls the vibration of each vibration device 2 as well as their respective vibration timing. The vibration controlling device 5 may be integrated in an integrated circuit.

In a first aspect, a control manner in which the vibration controlling device 5 controls vibration of each vibration device 2 is exemplarily described in embodiments of the present disclosure.

In an embodiment, when the display device includes one or more vibration devices 2 and the one or more vibration devices 2 are disposed at an arbitrary position on the display panel 1, the cover glass 3 or the cover glass fixing structure 4, as shown in FIG. 10, in which it is taken as an example that the vibration device 2 is disposed in the peripheral area NA of the display panel 1, the vibration control device 5 is connected to each vibration device 2, and the vibration control device 5 is used to control all the vibration devices 2 to vibrate simultaneously. The vibration controlling device 5 includes a plurality of output ends, each of which is connected to a control end of a vibration device 2. The output ends of the vibration control device 5 each simultaneously output a vibration-on signal (such as a high level signal) or a vibration-off signal (such as a low level signal), all the vibration devices 2 simultaneously vibrate according to the vibration-on signal or simultaneously stop vibrating according to the vibration-off signal.

In an embodiment, when the display device includes a plurality of vibration devices 2 and the plurality of vibration devices 2 is disposed at an arbitrary position on the display panel 1, the cover glass 3 or the cover glass fixing structure 4, as shown in FIG. 11, in which it is taken as an example that the vibration device 2 is disposed in the peripheral area NA of the display panel 1, the vibration control device 5 is connected to each force sensor 10 and each vibration device 2, the vibration controlling device 5 is used to control vibration of one or more vibration devices 2 nearby the force sensor 10 having the largest detected force according to the respective force detected by each force sensor 10. The vibration controlling device 5 includes a plurality of control ends and a plurality of output ends, each control end is connected to a force sensor 10, and each output end is connected to a vibration device 2. Each control end is configured to control one or more output ends. The control ends of the vibration controlling device 5 respectively obtain a plurality of signals from the force sensors 10, and the control end corresponding to the force sensor 10 having the largest detected force is identified based on the plurality of signals, and then the one or more output ends controlled by this control end output a vibration-on signal, so as to drive the one or more vibration devices 2 to vibrate.

In a second aspect, a control manner in which the vibration controlling device 5 controls vibration timing of each vibration device 2 is exemplarily described in embodiments of the present disclosure.

In an embodiment, as shown in FIG. 11, the vibration control device 5 is connected to each force sensor 10 and each vibration device 2. The vibration controlling device 5 is configured to control at least one vibration device 2 to vibrate when at least one of the forces detected by the force sensors 10 is greater than a threshold force. Optionally, the threshold force may be 1960N. The vibration controlling device 5 includes a plurality of control ends and a plurality of output ends, each control end is connected to a force sensor 10, and each output end is connected to a vibration device 2. Each control end is configured to control one or more output ends. The control ends of the vibration controlling device 5 respectively obtain a plurality of signals from the force sensors 10, and the control end corresponding to the force sensor 10 having the largest detected force is identified based on the plurality of signals, and then the one or more output ends controlled by this control end output a vibration-on signal, so as to drive the one or more vibration devices 2 to vibrate.

The inventor of the present disclosure found that, if the force applied to the display panel 1 is small, each layer of the display panel 1 is rarely subjected to non-elastic deformation, and thus very less stress is accumulated in the display panel 1, and the baseline of the force sensor 10 substantially does not drift, therefore the detection accuracy of the force sensor 10 with respect to the force is rarely influenced. In this case, the display panel 1 does not need to release accumulated stress by vibration. Therefore, the vibration controlling device 5 is configured to control at least one vibration device 2 to vibrate when at least one of the forces detected by the force sensors 10 is greater than a threshold force. In this case, the stress accumulated in the display panel 1 can be effectively released and the power consumption of the display device can be decreased, and the influence of the vibration on the display effect and on the user experience of the display device is very little.

In an embodiment, as shown in FIG. 12, the display device further includes a touch screen 6. The touch screen 6 is located at a light-emitting side of the display panel 1 or integrated in the display panel 1. The vibration controlling device 5 is connected to the touch screen 6 and each vibration device 2. The vibration controlling device 5 is used to control at least one vibration device 2 to vibrate after the touch screen 6 detects that the touch operation is completed. The vibration controlling device 5 has a control end and a plurality of output ends. The control end is connected to the touch screen 6, and each output end is correspondingly connected to a vibration device 2. Each control end is configured to control one or more output ends. The control end of the vibration controlling device 5 receives the signal from the touch screen 6, and the vibration controlling device 5 identifies whether the touch operation is completed according to this signal, and controls one or more output ends to output a vibration-on signal after the touch operation is completed so as to drive one or more vibration devices 2 to vibrate. In this case, the stress accumulated in the display panel 1 can be released in time, and the baseline of the force sensor 10 can be restored in time. The above-mentioned touch screen 6 may be a self-capacitance touch screen or a mutual-capacitance touch screen. The touch electrodes in the touch screen 6 may have various shapes, which will not be limited in the embodiments of the present disclosure.

Another example is described with reference to FIG. 12. The display device includes a touch screen 6, and the touch screen 6 is located at the light-emitting side of the display panel 1 or included in the display panel 1, and the vibration controlling device 5 controls the touch screen 6, the vibration device 2, which is connected to the pressure sensor. In this example, the vibration device 2 may use an eccentric motor, such as a linear resonance actuator (LRA), a piezoelectric haptic actuator, a thin film piezoelectric actuator, a shape memory alloy actuator, and a voice coil or the like. Similar to FIG. 11, the force sensor 10 is disposed on the array substrate. The vibration controlling device 5 is connected to a central processing unit (not shown). The central processing unit is configured to execute a process for displaying a button on the screen and a program associated with the button. When the touch screen 6 detects a touch, the vibration controlling device 5 sends the detected touch information and touch position to the central processing unit. The central processing unit executes the program associated with the pressed button based on the detected touch information and touch position. In addition, the central processing unit transmits a signal for controlling the vibration of the at least one vibration device 2 to the vibration controlling device 5, so as to present the user with a haptic stimulus within a suitable time period after the information of the detected touch is obtained. The vibration controlling device 5 receives a signal for controlling the vibration of the vibration device 2, controls the vibration of the vibration device 2 and vibrates one or more vibration devices 2. With such a configuration, it is possible to timely avoid the stress accumulated in the display panel 1, recover the baseline of the pressure sensor 10, and indicate a haptic feedback for the user. The vibration frequency used at this time is 200 Hz, and the acceleration of the touch surface of the touch screen is 0.5G (G is the gravitational acceleration). In other words, the display device includes a display panel, a touch screen coupled to the display panel, and a force sensor for detecting pressing on the touch screen, wherein the display device further includes at least one vibration device having features of vibrating the display panel, eliminating the stress accumulated on the display panel, and presenting a haptic feedback to the user.

Another example is described with reference to FIG. 12. Some of the descriptions in the previous examples will be omitted. In the display device of this example, when at least one force sensor 10 detects that the pressure is greater than a threshold pressure, the vibration controlling device 5 sends the information of the applied pressure to a central processing unit. In addition, a touch position obtained from the touch screen 6 is transmitted to the central processing unit. The central processing unit executes the program associated with the pressed button based on the information of the applied force and the touched position. After receiving the information of the applied force, the central processing unit sends a signal to the vibration controlling device 5 to control the vibration of at least one vibration device 2, so as to present the user with a haptic stimulus within a suitable time period. The vibration controlling device 5 receives a signal for controlling the vibration of the vibration device 2, controls the vibration of the vibration device 2, and vibrates one or more vibration devices 2. With such a configuration, it is possible to timely avoid the stress accumulated in the display panel 1, recover the baseline of the pressure sensor 10, and provide a haptic feedback to the user.

It should be noted that, the display panel in the embodiments of the present disclosure may be a liquid crystal display panel, an organic light-emitting display panel, or a micro light-emitting diode display panel, which will not be limited in the embodiments of the present disclosure. In FIGS. 3-5 and FIGS. 9-12, it is merely an example that the display panel is a liquid crystal display panel.

In an embodiment, as shown in FIG. 3, the display panel 1 is a liquid crystal display panel. The liquid crystal display panel includes an array substrate 11 and a color film substrate 12 disposed opposite to the array substrate 11. A liquid crystal layer 13 is disposed between the array substrate 11 and the color film substrate 12. A plurality of gate lines and a plurality of data lines are arranged on the array substrate in a crisscross manner. The plurality of gate lines and the plurality of data lines define a plurality of pixel units, and each of the plurality of pixel units is provided with a thin film transistor and a pixel electrode. The gate electrode of the thin film transistor is electrically connected to the gate line, and the source electrode of the thin film transistor is electrically connected to the data line, and the drain electrode of the thin film transistor is electrically connected to the pixel electrode. The color film substrate includes a grid-shaped black matrix and a plurality of color filters disposed in an opening of the black matrix, and the color filters are disposed in an array. The color filters include red color filters, green color filters and blue color filters. The array substrate or the color film substrate is further provided with a common electrode. Deflection of the liquid crystal molecules is controlled by an electric field formed between the pixel electrode and the common electrode. In this case, the display device further includes a backlight module located at a side of the array substrate away from the color film substrate, and the backlight module provides light for the display panel 1.

In an embodiment, the display panel is an organic light-emitting display panel. The organic light-emitting display panel includes an array substrate including a plurality of pixel circuits. The organic light-emitting display panel further includes a plurality of organic light-emitting diodes (Organic Light-Emitting Diodes, OLEDs) disposed on the array substrate, an anode of each organic light-emitting diode is correspondingly electrically connected to the pixel circuit on the array substrate. The plurality of light-emitting diodes includes light-emitting diodes for emitting red light, light-emitting diodes for emitting green light, and light-emitting diodes for emitting blue light. In addition, the organic light-emitting display panel further includes a packaging layer covering the plurality of organic light-emitting diodes.

In an embodiment, the display panel is a micro light-emitting diode display panel. The micro light-emitting diode display panel includes an array substrate, and the array substrate includes a plurality of pixel circuits. The micro light-emitting diode display panel further includes a plurality of micro light-emitting diodes (Micro Light-Emitting Diodes, Mic-LEDs) disposed on the array substrate. An anode of each of the Mic-LEDs is correspondingly electrically connected to a pixel circuit on the array substrate. The plurality of Mic-LEDs includes Mic-LEDs for emitting red light, Mic-LEDs for emitting green light, and Mic-LEDs for emitting blue light. The Mic-LEDs may be formed on a growth substrate and subsequently transferred to the array substrate by transferring.

In addition, the force sensor 10 in the embodiments of the present disclosure may be any structure having a force sensing function.

Figure 13:
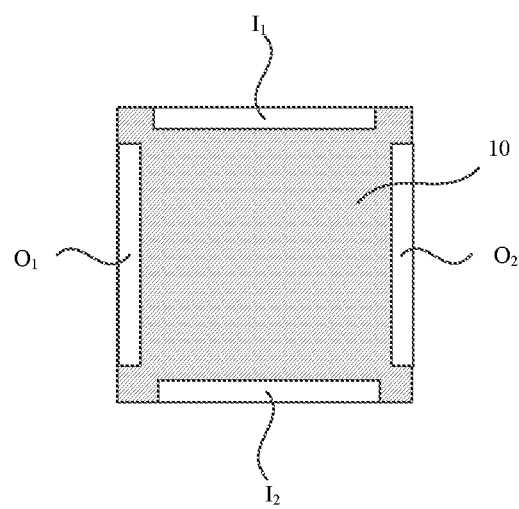
FIG. 13 is structural schematic diagram I of a force sensor provided by an embodiment of the present disclosure.

In an embodiment, as shown in FIG. 13, FIG. 13 is structural schematic diagram I of a force sensor provided by an embodiment of the present disclosure. The force sensor 10 is a formed as a one-piece semiconductor structure. Each force sensor 10 includes a first input $I_1$, a second input $I_2$, a first output $O_1$, and a second output $O_2$. When a shape of the force sensor 10 is rectangular, two opposite sides of the force sensor 10 respectively serve as the first input $I_1$ and the second input $I_2$, and the other two opposite sides of the force sensor 10 respectively serve as the first output $O_1$ and the second output $O_2$. The first input $I_1$ and the second input $I_2$ are used to input a bias voltage signal to the force sensor 10. The first output $O_1$ and the second output $O_2$ are used to output a force-sensitive detection signal from the force sensor 10. Further, a shape of the force sensor 10 may be square.

When the force sensor 10 detects the force applied to the display panel 1, the display panel 1 is deformed under action of the force so that the force sensor 10 is deformed, then the output signals of the first output $O_1$ and the second output $O_2$ are changed. Usually, the magnitude of the fore applied to the display panel 1 can be calculated via values of the output signals from the first output $O_1$ and the second output $O_2$.

Figure 14:
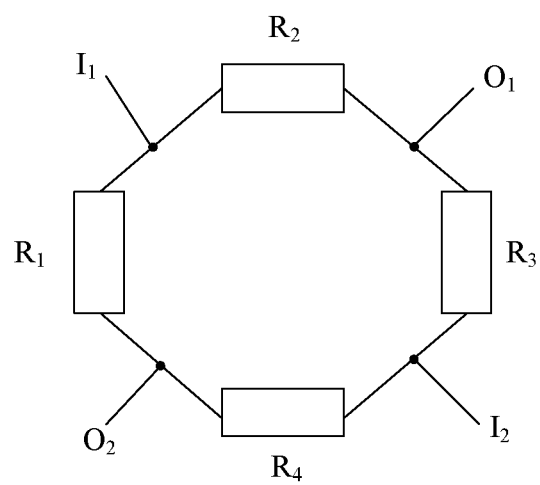
FIG. 14 is structural schematic diagram II of a force sensor provided by an embodiment of the present disclosure.

In an embodiment, as shown in FIG. 14, FIG. 14 is structural schematic diagram II of a force sensor provided by an embodiment of the present disclosure. The force sensor 10 is a formed as a Wheatstone bridge structure. Each force sensor 10 includes a first resistor $R_1$, a second resistor $R_2$, a third resistor $R_3$ and a fourth resistor $R_4$. A second end of the first resistor $R_1$ is electrically connected to a first end of the second resistor $R_2$, a second end of the second resistor $R_2$ is electrically connected to a first end of the third resistor $R_3$, a second end of the third resistor $R_3$ is electrically connected to a first end of the fourth resistor $R_4$, a second end of the fourth resistor $R_4$ is electrically connected to a first end of the first resistor $R_1$. A first input $I_1$ is provided between the second end of the first resistor $R_1$ and the first end of the second resistor $R_2$, a first output $O_1$ is provided between the second end of the second resistor $R_2$ and the first end of the third resistor $R_3$, a second input $I_2$ is provided between the second end of the third resistor $R_3$ and the first end of the fourth resistor $R_4$, a second output $O_2$ is provided between the second end of the fourth resistor $R_4$ and the first end of the first resistor $R_1$. The first input $I_1$ and the second input $I_2$ are configured to input a bias voltage signal to the force sensor 10. The first output $O_1$ and the second output $O_2$ are configured to output a force-sensing detection signal from the force sensor 10.

The principle of the force sensor 10 having the above-mentioned structure for detecting the force applied to the display panel 1 is as follows. As shown in FIG. 14, the first resistor $R_1$, the second resistor $R_2$, the third resistor $R_3$ and the fourth resistor $R_4$ form a Wheatstone bridge. The first resistor $R_1$, the second resistor $R_2$, the third resistor $R_3$ and the fourth resistor $R_4$ are four arms of the Wheatstone bridge. When a power source is connected between the first input $I_1$ and the second input $I_2$, there exists electric current in each branch of the Wheatstone bridge. When resistances of the first resistor $R_1$, the second resistor $R_2$, the third resistor $R_3$ and the fourth resistor $R_4$ satisfy the condition of $R_2/R_3=R_1/R_4$, a potential of the first output $O_1$ is equal to a potential of the second output $O_2$, and if a galvanometer is connected therebetween, then the current flowing through the galvanometer is zero, and the galvanometer pointer indicates zero scale, at this moment, the Wheatstone bridge is in a balance state, in which $R_2/R_3=R_1/R_4$ is a balance condition of the Wheatstone bridge. When the force sensor 10 detects the force applied to the display panel 1, the display panel 1 is deformed under action of the force so that the resistances of the first resistor $R_1$, the second resistor $R_2$, the third resistor $R_3$ and the fourth resistor $R_4$ change, which does not satisfy the above-mentioned balance condition for the Wheatstone bridge, so that the potential of the first output $O_1$ is not equal to the potential of the second output $O_2$, and if a galvanometer is connected therebetween, then the current flowing through the galvanometer is not zero, and thus the galvanometer pointer deflects, and a corresponding output signal value is output, and then the magnitude of the force applied to the display panel 1 can be obtained through the signal value.

Figure 15:
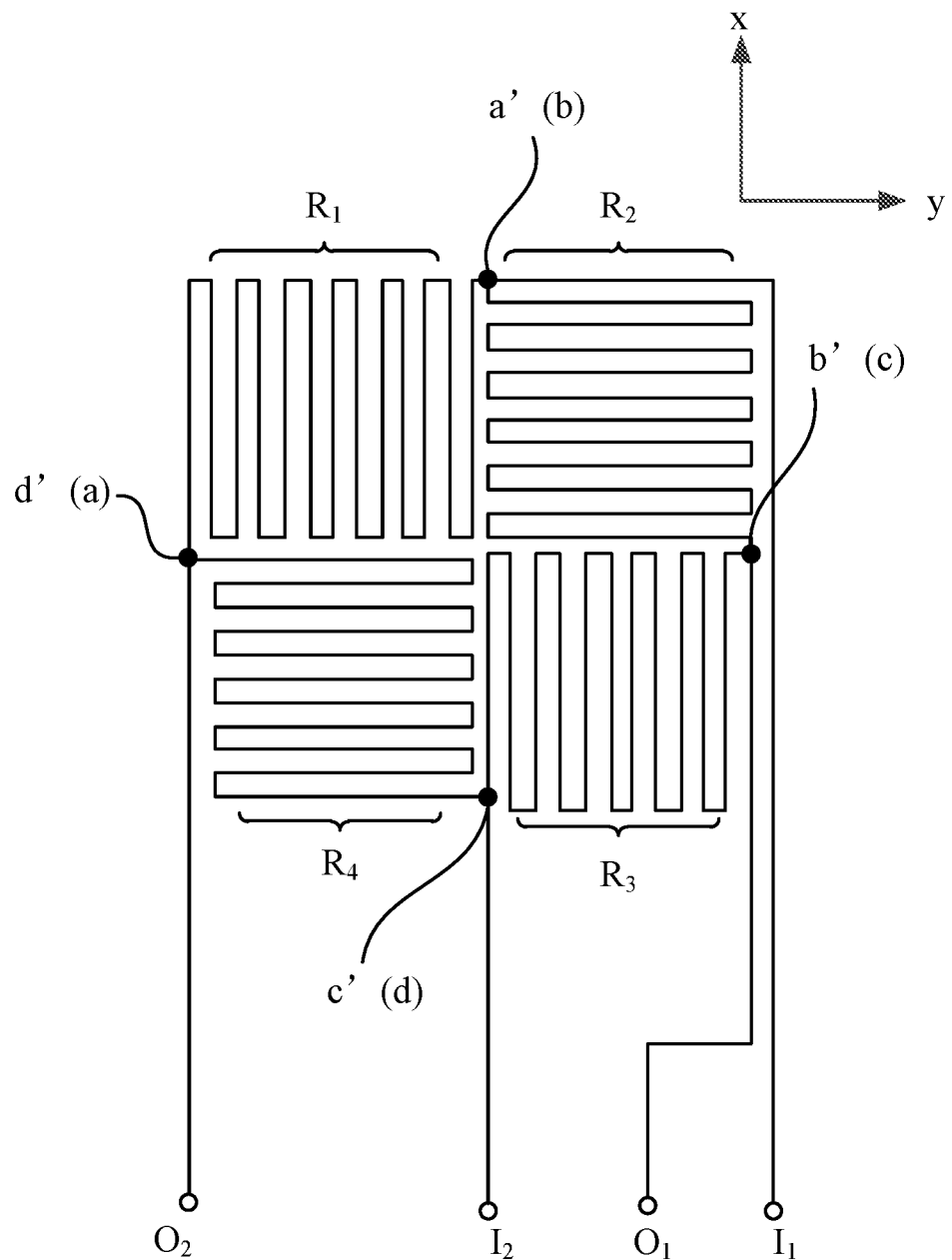
FIG. 15 is structural schematic diagram III of a force sensor provided by an embodiment of the present disclosure.

The first resistor $R_1$, the second resistor $R_2$, the third resistor $R_3$ and the fourth resistor $R_4$ may have various shapes. For example, as shown in FIG. 15, FIG. 15 is structural schematic diagram III of a force sensor provided by an embodiment of the present disclosure. The force sensor 10 includes a first extending direction x and a second extending direction y, the first extending direction x intersects with the second extending direction y. For an extending length of the first resistor $R_1$ from a first end a to a second end a', a component of the extending length in the first extending direction x is larger than that in the second extension direction y. For an extending length of the second resistor $R_2$ from a first end b to a second end b', a component of the extending length in the first extending direction x is smaller than that in the second extension direction y. For an extending length of the third resistor $R_3$ from a first end c to a second end c', a component of the extending length in the first extending direction x is larger than that in the second extension direction y. For an extending length of the fourth resistor $R_4$ from a first end d to a second end d', a component of the extending length in the first extending direction x is smaller than that in the second extension direction y. With such a structure, the first resistor $R_1$ and the third resistor $R_3$ can sense the strain in the first extending direction x, the second resistor $R_2$ and the fourth resistor $R_4$ can sense the strain in the second extending direction y. In addition, an area of the entire force sensor 10 is relatively small, which drives it less affected by temperature.

Figure 16:
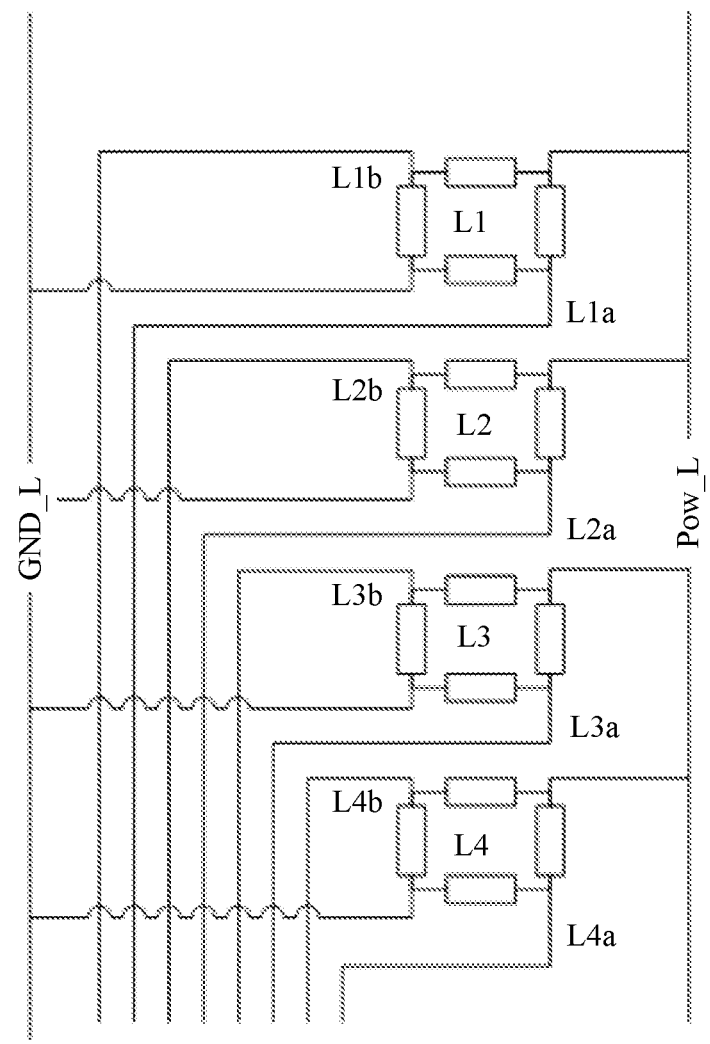
FIG. 16 is a schematic diagram showing connection of force sensors provided by an embodiment of the present disclosure.

In an embodiment, as shown in FIG. 2, four force sensors 10 are evenly arranged at each sub-area of two opposite sub-areas of the peripheral area NA of the display panel 1. As shown in FIG. 16, FIG. 16 is a schematic diagram showing connection of force sensors provided by an embodiment of the present disclosure. Four force sensors shown in FIG. 16 are respectively denoted as L1, L2, L3 and L4. The first inputs of the four force sensors 10 are electrically connected to the integrated circuit (not shown in FIG. 16) via one wiring (denoted as GND_L in FIG. 16), and the second inputs of the four force sensors 10 are electrically connected to the integrated circuit via one wiring (denoted as Pow_L in FIG. 16). The outputs of the four force sensors 10 (i.e., L1a, L1b, L2a, L2b, L3a, L3b, L4a and L4b shown in FIG. 16) are electrically connected to the integrated circuit via respective wirings. It should be noted that, in the embodiments of the present disclosure, the number of the force sensors 10 evenly arranged at each sub-area of two opposite sub-areas of the peripheral area NA of the display panel 1 is not limited to four, and it may also be other numbers, such as three, five and so on.

The present disclosure provides a display device. The display device includes a display panel 1, which is divided into a display area AA and a peripheral area NA surrounding the display area AA. A plurality of force sensors 10 is provided in the peripheral area NA. The display device further includes at least one vibration device 2, which is used to drive the display panel 1 to vibrate, so as to release stress accumulated in display panel 1, so that each layer included in the display panel 1 can be restored from non-elastic deformation, and thus the force sensor 10 is not deformed when no force is applied to a position where the force sensor 10 is located, which can effectively prevent a baseline of the force sensor 10 from drifting, thereby improving the detection accuracy of the force sensor 10 with respect to the force.

Finally, it should be noted that, the above-mentioned embodiments are merely for illustrating the present disclosure but not intended to provide any limitation. Although the present disclosure has been described in detail with reference to the above-mentioned embodiments, it should be understood by those skilled in the art that, it is still possible to modify the technical solutions described in the above embodiments or to equivalently replace some or all of the technical features therein, but these modifications or replacements do not cause the essence of corresponding technical solutions to depart from the scope of the present disclosure.

What is claimed is:

1. A display device, comprising:
   a display panel, the display panel being divided into a display area and a peripheral area surrounding the display area, wherein a plurality of force sensors is disposed in the peripheral area; and
   at least one vibration device, configured to drive the display panel to vibrate to release stress accumulated in the display panel,
   wherein the display device further comprises a touch screen and a vibration controlling device, the touch screen is located at a light-emitting side of the display panel or integrated in the display panel, the vibration controlling device is connected to the touch screen and each of the at least one vibration device, and the vibration controlling device is configured to control one or more of the at least one vibration device to vibrate after the touch screen detects that a touch operation is completed.

2. The display device according to claim 1, wherein the display device further comprises a vibration controlling device, the vibration controlling device is connected to each of the plurality of force sensors and each of the at least one vibration device, the vibration controlling device is configured to control one or more of the at least one vibration device to vibrate when at least one force detected by the plurality of force sensors is greater than a threshold force.

3. The display device according to claim 2, wherein the threshold force is 1960N.

4. The display device according to claim 1, wherein a vibration frequency of the at least one vibration device is not less than 1 Hz and not greater than 1 kHz.

5. The display device according to claim 1, wherein the display device further comprises a cover glass covering a light-emitting side of the display panel, and an edge of the cover glass exceeds the display panel.

6. The display device according to claim 5, wherein the vibration device is disposed at the edge of the cover glass exceeding the display panel and located at a side of the cover glass facing the display panel.

7. The display device according to claim 5, wherein the display device further comprises a cover glass fixing structure, configured to fix the cover glass at a position with respect to the display device, and the at least one vibration device is disposed on the cover glass fixing structure.

8. The display device according to claim 1, wherein the peripheral area has two opposite sub-areas, and four force sensors are evenly arranged at each of the two opposite sub-areas of the peripheral area of the display panel.

9. A display device, comprising a display panel, a touch screen coupled to the display panel, and a force sensor for detecting pressing of the touch screen, wherein the display device further comprises at least one vibration device, wherein the display device vibrates the display panel to eliminate stress accumulated on the display panel and present a haptic feedback to a user,
wherein the display device further comprises a vibration controlling device, the touch screen is located at a light-emitting side of the display panel or integrated in the display panel, the vibration controlling device is connected to the touch screen and each of the at least one vibration device, and the vibration controlling device is configured to control one or more of the at least one vibration device to vibrate after the touch screen detects that a touch operation is completed.

10. The display device according to claim 1, wherein the at least one vibration device is disposed in the peripheral area of the display panel.

11. The display device according to claim 10, wherein the at least one vibration device is a plurality of vibration devices evenly disposed in the peripheral area of the display panel.

12. The display device according to claim 11, wherein a number of the plurality of vibration devices is the same as a number of the plurality of force sensors, and the plurality of vibration devices one-to-one corresponds to the plurality of force sensors.

13. The display device according to claim 11, wherein the display device further comprises a vibration controlling device, the vibration controlling device being connected to each of the plurality of vibration devices and configured to control all of the plurality of vibration devices to vibrate simultaneously.

14. The display device according to claim 12, wherein the display device further comprises a vibration controlling device, the vibration controlling device being connected to each of the plurality of vibration devices and configured to control all of the plurality of vibration devices to vibrate simultaneously.

15. The display device according to claim 11, wherein the display device further comprises a vibration controlling device, the vibration controlling device is connected to each of the plurality force sensors and each of the plurality of vibration devices, the vibration controlling device is configured to, based on respective forces detected by the plurality of force sensors, control one or more of the vibration devices nearby one of the force sensors being subjected to a largest detected force, to vibrate.

16. The display device according to claim 12, wherein the display device further comprises a vibration controlling device, the vibration controlling device is connected to each of the plurality force sensors and each of the plurality of vibration devices, the vibration controlling device is configured to, based on respective forces detected by the plurality of force sensors, control one or more of the vibration devices nearby one of the force sensors being subjected to a largest detected force, to vibrate.

* * * * *